(No Model.) 6 Sheets—Sheet 2.
H. DENNEY.
MACHINE FOR MAKING TUBING FROM PAPER STRIPS.
No. 444,950. Patented Jan. 20, 1891.
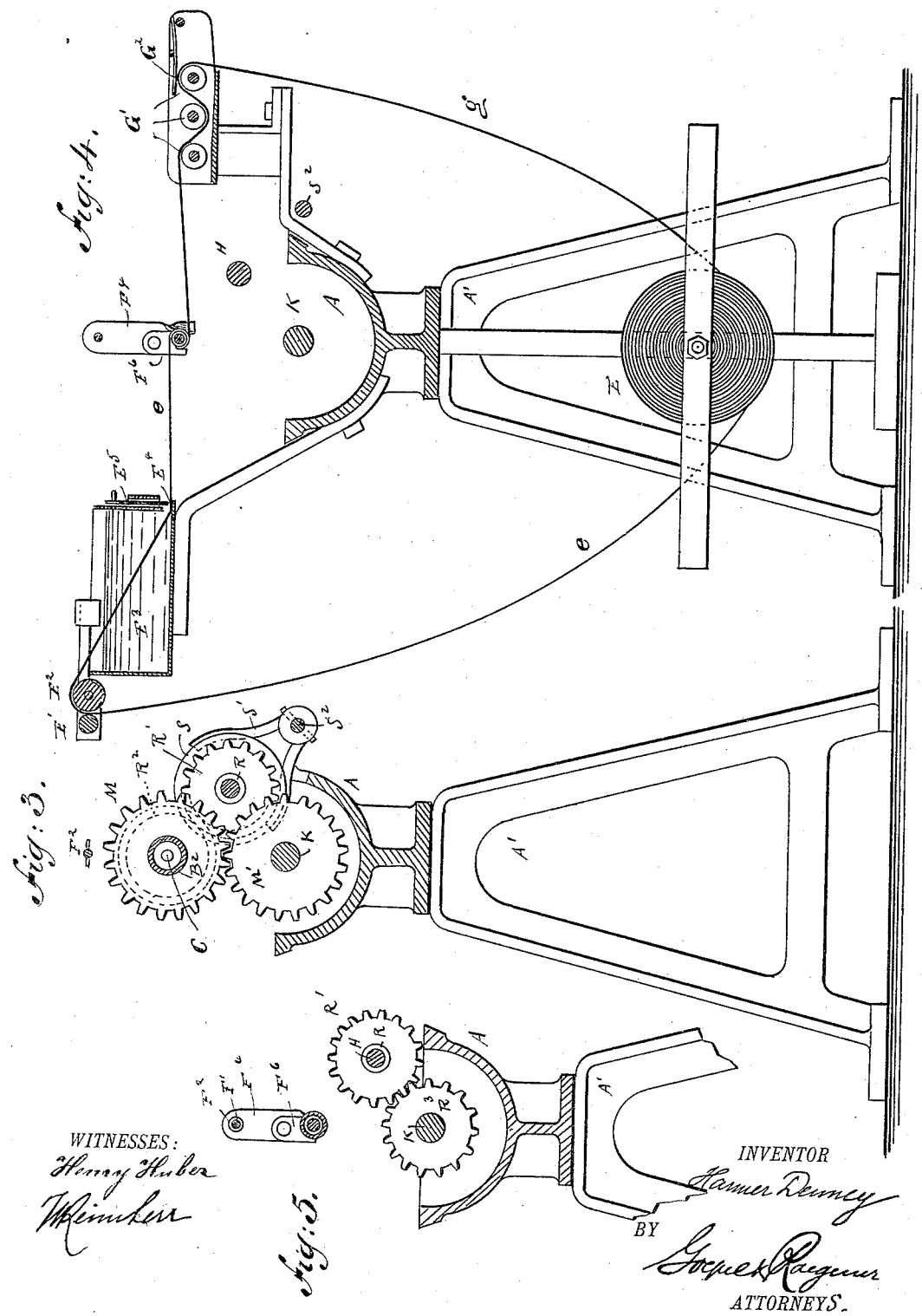
WITNESSES:
INVENTOR
ATTORNEYS.

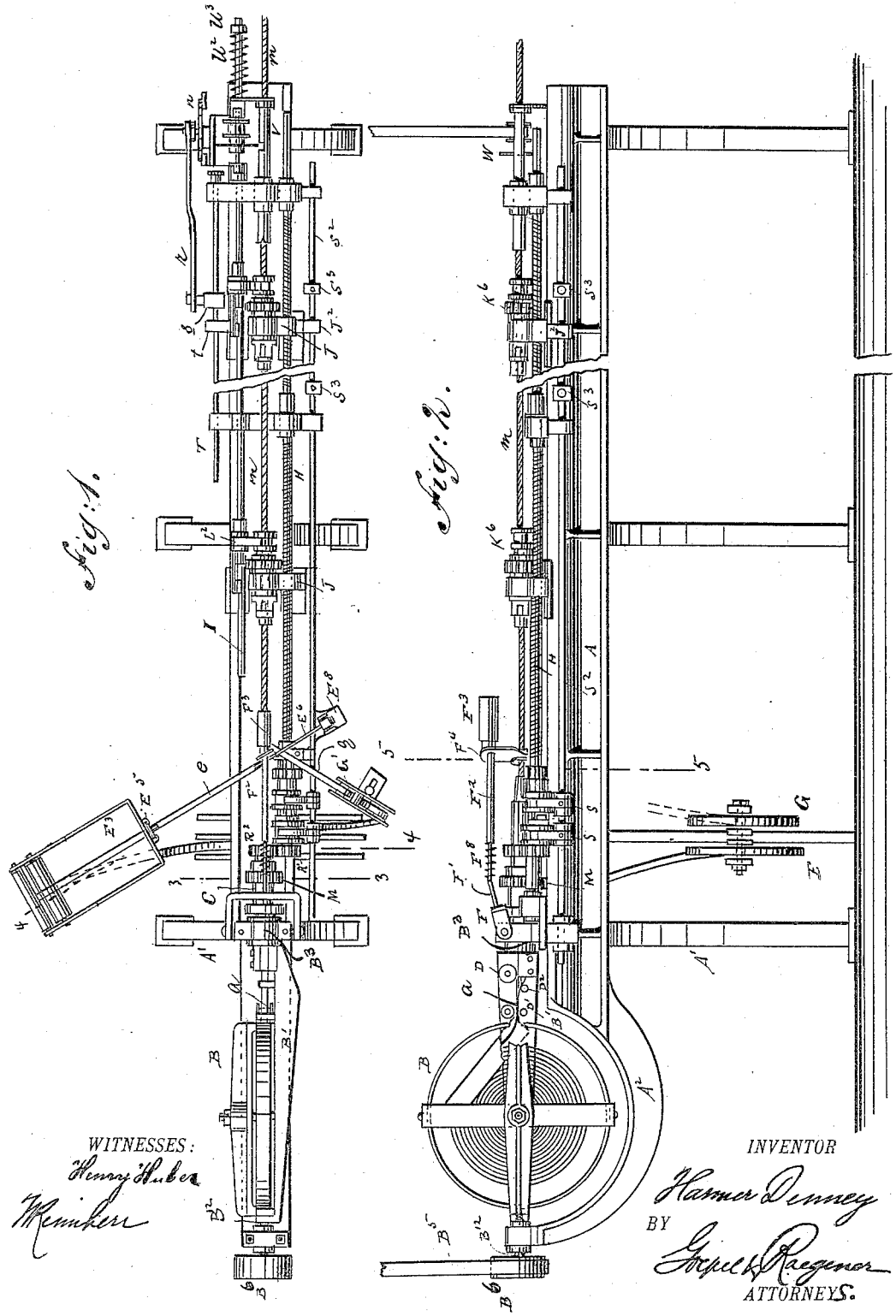

(No Model.)  
6 Sheets—Sheet 3

H. DENNEY.
MACHINE FOR MAKING TUBING FROM PAPER STRIPS.

No. 444,950. Patented Jan. 20, 1891.

WITNESSES:  
Henry Huber  
W. Reinken

INVENTOR  
Harmer Denney  
BY  
Gorpuck & Raegener  
ATTORNEYS.

(No Model.)  6 Sheets—Sheet 4.
H. DENNEY.
MACHINE FOR MAKING TUBING FROM PAPER STRIPS.

No. 444,950. Patented Jan. 20, 1891.

WITNESSES:
Henry Huber
W. Reinker

INVENTOR
Harmer Denney
BY
Gospel Raegener
ATTORNEYS.

(No Model.) 6 Sheets—Sheet 5.
H. DENNEY.
MACHINE FOR MAKING TUBING FROM PAPER STRIPS.
No. 444,950. Patented Jan. 20, 1891.
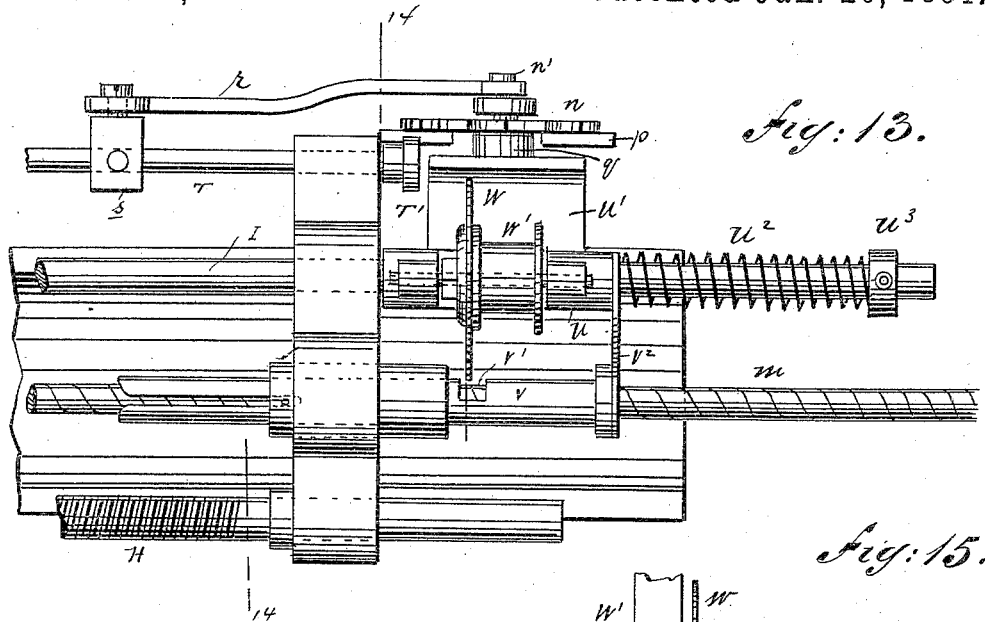
Fig. 13.
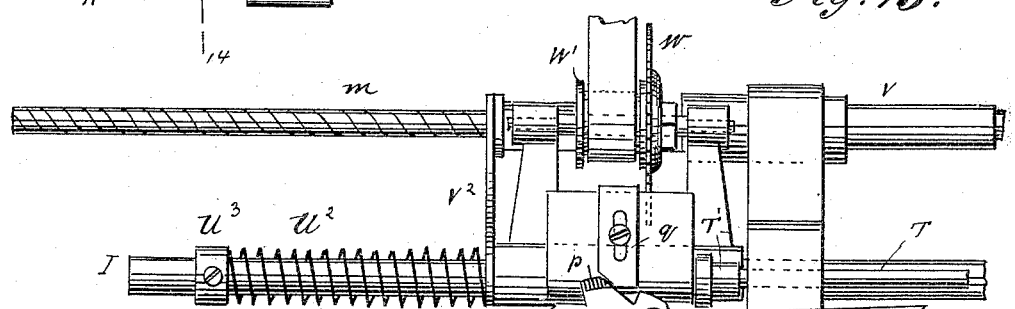
Fig. 15.
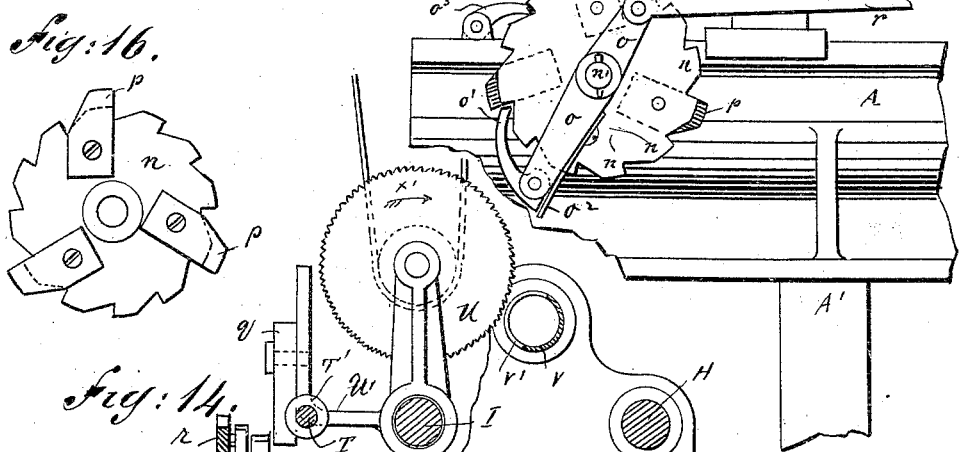
Fig. 16.
Fig. 14.
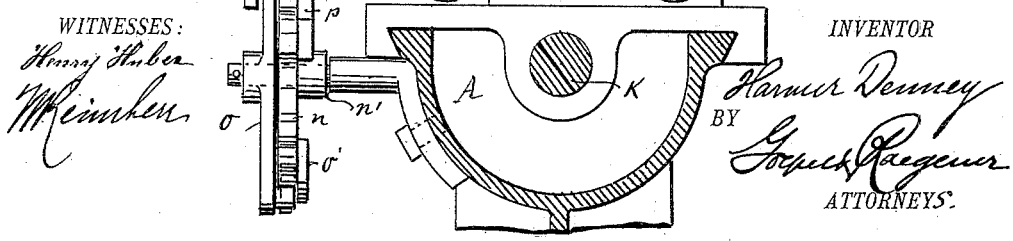
WITNESSES:
INVENTOR
Harmer Denney
BY
ATTORNEYS.

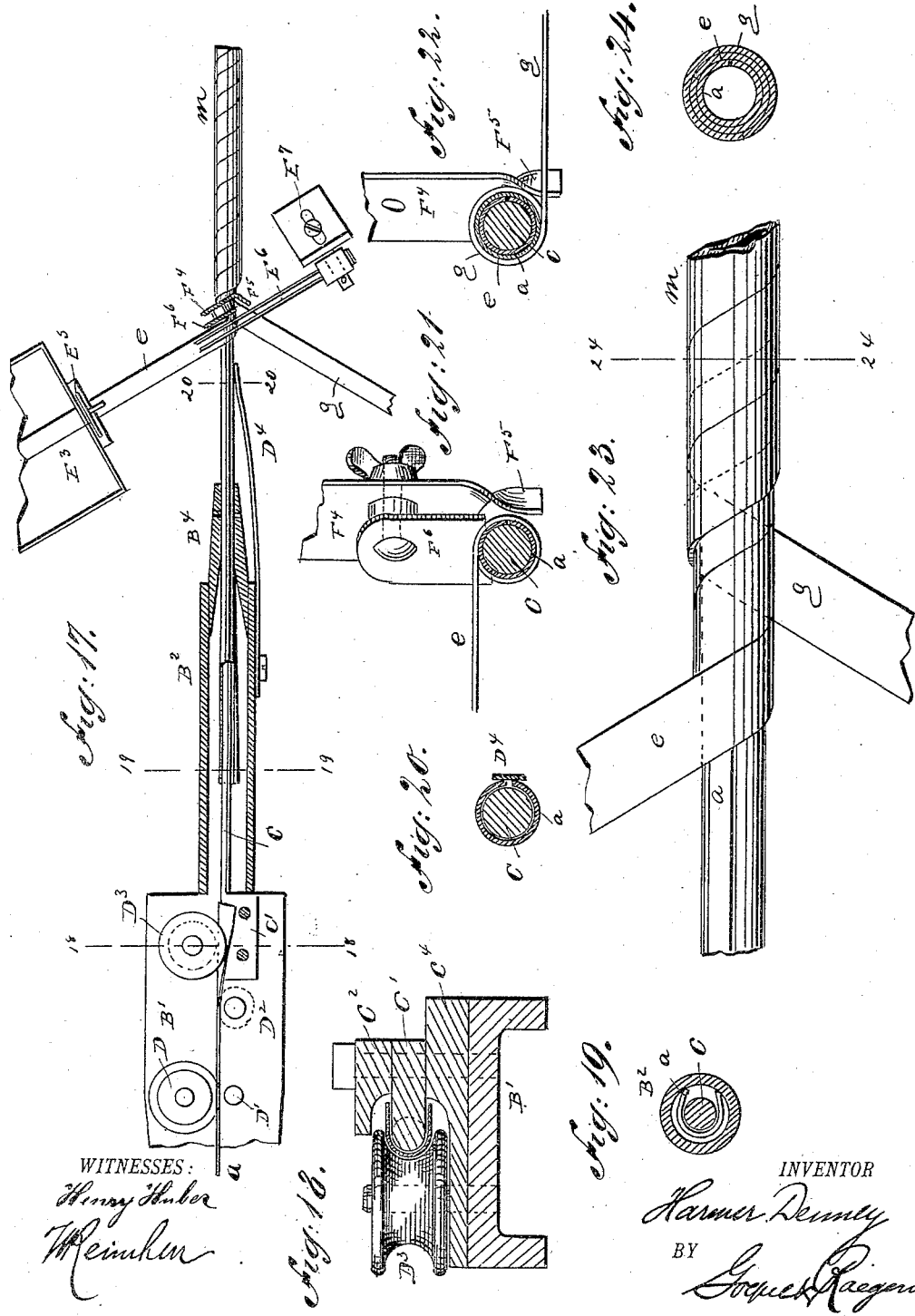

UNITED STATES PATENT OFFICE.

HARMER DENNEY, OF NEW YORK, N. Y., ASSIGNOR TO THE INTERIOR CONDUIT AND INSULATION COMPANY, OF SAME PLACE.

MACHINE FOR MAKING TUBING FROM PAPER STRIPS.

SPECIFICATION forming part of Letters Patent No. 444,950, dated January 20, 1891.

Application filed February 27, 1890. Serial No. 341,934. (No model.)

*To all whom it may concern:*

Be it known that I, HARMER DENNEY, of the city of New York, in the county of New York and State of New York, a citizen of the United States, have invented certain new and useful Improvements in Machines for Making Tubing from Paper Strips, of which the following is a specification.

The object of my invention is to provide a new and improved machine for making strong and durable tubes in any desired length from paper strips.

The invention consists in mechanism for shaping a paper strip so as to form a core, combined with mechanism for automatically winding and pasting two paper strips spirally and one upon the other on said core.

The invention further consists in automatically reversing mechanism for grasping and drawing along the tubes thus formed; and it also consists in the construction and combination of parts and details, as will be fully described and set forth hereinafter, and then pointed out in the claims.

Figure 6:
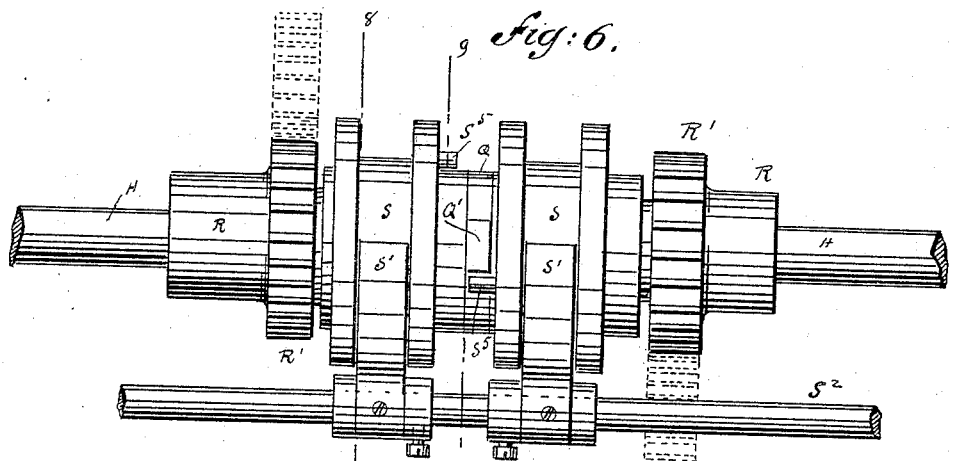
Figure 7:
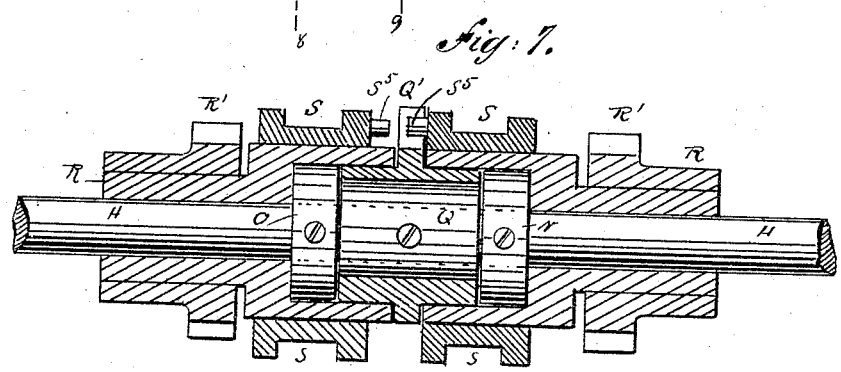
Figure 8:
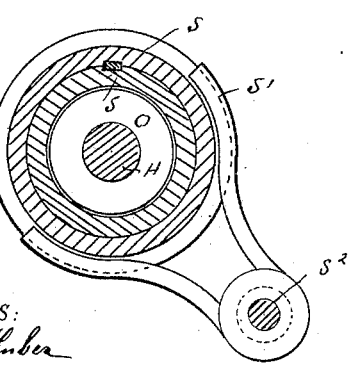
Figure 9:
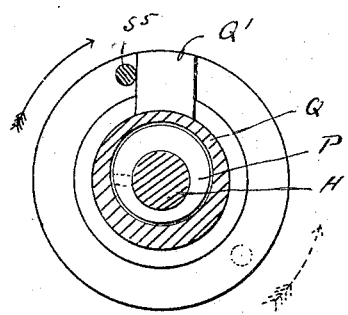
Figure 10:
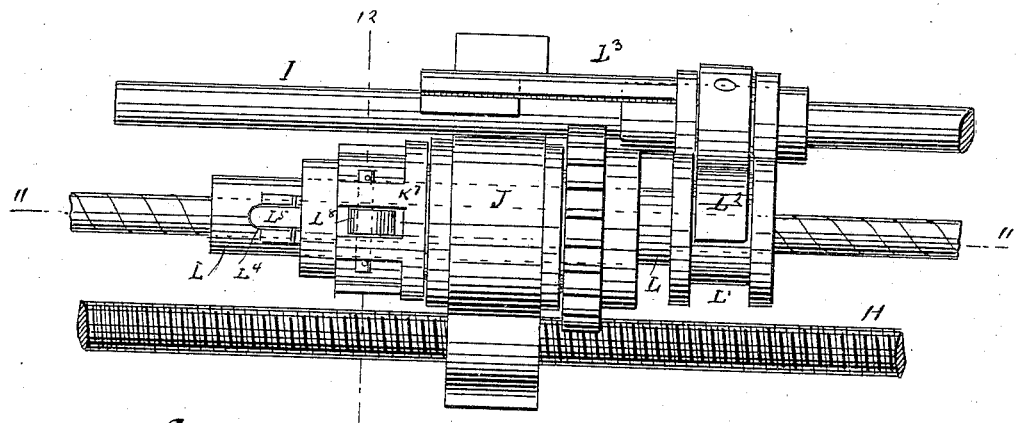
Figure 11:
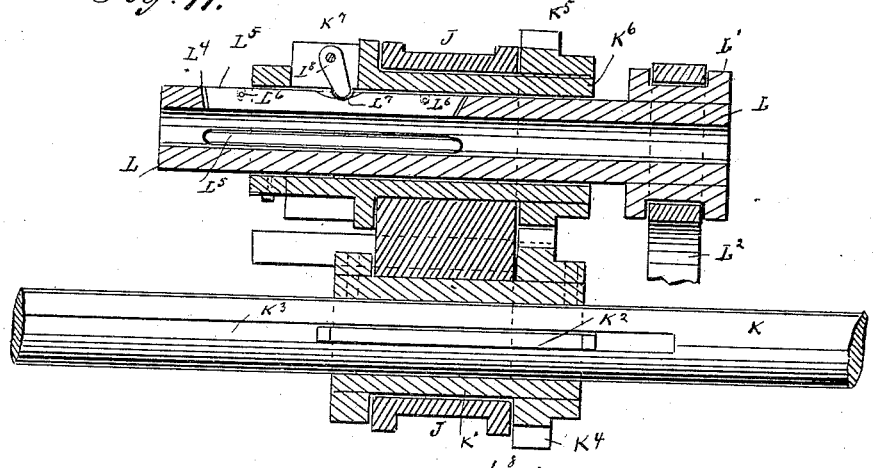
Figure 12:
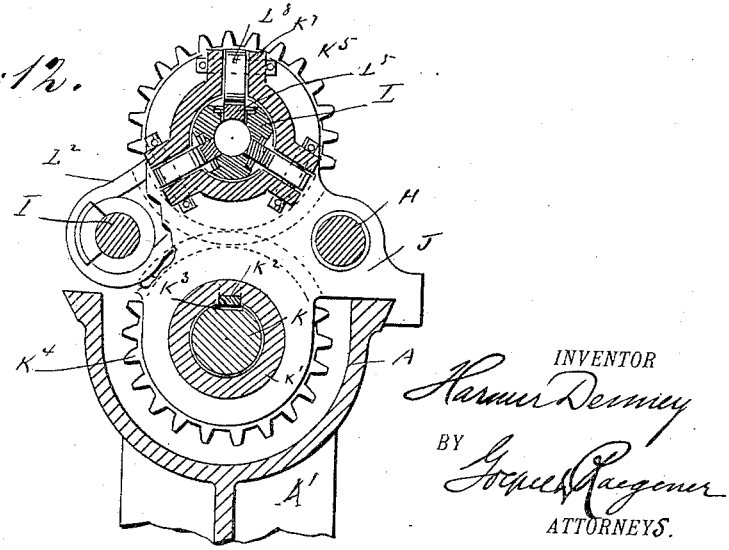

In the accompanying drawings, Figure 1 is a plan view of my improved machine for making paper tubings, parts being broken out. Fig. 2 is a longitudinal elevation of the same, parts being broken out. Fig. 3 is a vertical transverse sectional view on an enlarged scale on the line 3 3, Fig. 1. Fig. 4 is a vertical transverse sectional view on an enlarged scale on the line 4 4, Fig. 1. Fig. 5 is a vertical transverse sectional view on the line 5 5, Fig. 2. Fig. 6 is a plan view of the automatic reversing-clutch for the tube gripping and carrying devices. Fig. 7 is a vertical longitudinal sectional view of the same. Fig. 8 is a vertical transverse sectional view of the same on the line 8 8, Fig. 6. Fig. 9 is a similar view on the line 9 9, Fig. 6. Fig. 10 is a plan view of one of the tube gripping and conveying devices. Fig. 11 is a vertical longitudinal sectional view of the same on the line 11 11, Fig. 10. Fig. 12 is a vertical transverse sectional view of the same on the line 12 12, Fig. 10. Fig. 13 is a plan view of parts of the machine, showing the devices for sawing off the tubes at proper lengths. Fig. 14 is a vertical transverse sectional view of the same on the line 14 14, Fig. 13. Fig. 15 is a longitudinal elevation of the sawing device. Fig. 16 is an inside face view of the cam-wheel for shifting the saw. Fig. 17 is a detail horizontal sectional view of the guide for the core-strips, and also shows in plan view the paper-guides and other parts. Figs. 18, 19, and 20 are enlarged detail transverse sectional views on the lines 18 18, 19 19, and 20 20, respectively, of Fig. 17. Fig. 21 is a detail view of the paper-strip-winding guide and a cross-section of the core on the mandrel. Fig. 22 is a similar view showing both strips on the core. Fig. 23 is a longitudinal view of a piece of tubing made by the machine, showing the core and the two covering-strips. Fig. 24 is a vertical transverse sectional view on the line 24 24, Fig. 23.

Similar letters of reference indicate like parts.

The frame A is provided with legs A'. At the rear end of said frame a curved bracket $A^2$ is provided for holding the reel B, containing the coiled strip of paper for forming the core of the tube. Said reel B is mounted on a bar B', terminating at one end in a pivot $B^2$, that is mounted to turn in the free end of the bracket $A^2$, and the opposite end of said bar B' terminates in a tubular pivot $B^2$, that is mounted to turn in the cross-piece $B^3$ at the rear end of the machine-frame. Said tubular pivot $B^2$ is provided with a tapering end piece $B^4$, through which the mandrel C projects. The inner end of said mandrel is connected with a block C', which in turn is bolted to the adjacent end of the bar B', the outer edge of said block being rounded to form a continuation of the outer surface of the mandrel, as shown in Figs. 17 and 18.

A curved guide-piece $C^2$ is bolted to the top of the block C', and the bottom plate $C^4$ below said block C' is provided with a curved recess, as shown in Fig. 18, said curved guide-piece and the curved bottom recess serving to confine the strip of paper $a$ after it has been pressed against the rounded edge of the block C'.

The paper strip $a$, which is unwound from the coil of paper in the reel B, is guided between the guide-rollers D and D' on the bar B', and then passes over the roller D², which has a convexly-rounded edge and is arranged adjacent to one end of the block C', as shown in Fig. 17. The paper strip, which is bent U-shaped in cross-section by the roller D², is pressed against the rounded outer edge of the block C' by the roller D³, mounted on the bar B', adjacent to the rounded edge of the block C', and which roller D³ is provided with a convex circumferential groove, as shown in Figs. 17 and 18. As the paper strip thus bent transversely passes through the tapering tubular end piece B⁴, it is closed and forms tubular core—that is to say, it is pressed completely around the mandrel C, on which it slides, so that its longitudinal edges will be put a short distance from each other, as shown, for exemple, in Fig. 20. A short distance from the outer end of the tapering end piece B⁴ the free end of a spring-strip D⁴ rests against the joints of the tubular core thus formed and keeps the edges of the same in contact with the mandrel, as shown in Figs. 17 and 20. A short distance beyond the end of said strip B⁴ the covering-strips are wound upon the core spirally, and the means for guiding and feeding said strips will now be described.

On one of the standards of the machine-frame two coils of paper strips E and G are mounted. The paper strip $e$ from the coil E passes between two tension or friction rollers E' and E², mounted on a projection of a box E³, containing some suitable paste. The strip E passes diagonally through the said box E³ from the top at the rear end to the bottom at the front end, where said strip passes through a slot E⁴ in the front of the box at the bottom. A vertical sliding and adjustable doctor E⁵ scrapes off the surplus paste from the upper surface of the strip. Said strip then passes to the core, as shown. The paper strip $g$ from the other coil of paper is passed over the friction-rollers G' and under a tension-spring G², and then passes directly to the core. Said strip $g$ is not provided with any paste. Two spring-wires E⁶ are secured adjustably on a standard E⁷ of a bracket E⁸ on the machine-frame, and the free ends of said spring-wires E⁶ press the paper strip $e$ upon the core. A yoke F is pivoted on the machine-frame and is provided with a projecting rod F', on which a tube F² can slide, which tube is provided on its free end with a weight F³ and with a downwardly-projecting guide-piece F⁴, provided at its lower end with an arm F⁵, which is so bent that one edge of the same serves for guiding the paper strip $g$ while the same is being wound on the core, as shown in Figs. 17 and 22.

By means of a thumb nut and screw the guide-arm F⁶ is held on the guide-piece F⁴, and is provided in its bottom with a segmental recess adapted to rest on the top of the tube and serving for guiding the strip $e$ as the same is being wound on the tube, as shown in Figs. 17, 21, and 23. The strip $e$ is wound on the core from the top and the strip $g$ from the bottom. For the purpose of permitting said guides to give, so as to prevent rupturing the strips or uneven winding or doubling, the sliding tube F² is connected with the rod F' by a spiral spring F⁸, surrounding the rod F'. This entire device can be raised and swung out of the way when not required, and can be easily lowered when the machine is to operate. At said guide device the two strips $e\ g$ are wound on the core, as shown, and thus the tube is complete, the same consisting of the core formed by the strip $a$ and the inner or primary covering formed by the strip $e$, wound on the core spirally in one direction, and the outer covering formed by the paper strip $g$, wound upon the spiral strip $e$ in opposite direction. The strip $e$ in passing through the paste in the box E³ is covered with paste on both sides, and thus when wound upon the core it completely closes the same and is pasted upon said core by the paste applied on one side of said strip. As the paper strip $g$ is applied to and wound directly upon the outer paste-covered face of the strip $e$, it adheres firmly to the same, and no paste whatever appears on the outer surface of the tube thus formed. The mechanism thus described merely produces the paper tube out of the three strips; and it now remains to describe the devices for moving the tube in the direction of its length uniformly and constantly, so as to cause a proper spiral winding of the strips without straining, bruising, or crushing the tube thus formed. Rotary movement is imparted to the tube B² by the bar B', which is driven by a pulley B⁶ on one end of the same, over which the driving-belt B⁵ passes. A screw-spindle H is mounted longitudinally on the frame of the machine, one half of which spindle is provided with a right-hand screw-thread and the other with a left-hand screw-thread, as shown in Figs. 1 and 2. A guide-rod I is fixed on the frame of the machine parallel with the screw-spindle H, but at the opposite side of the frame. On said spindle H and guide-rod I two gripping devices or clutches are mounted, which constantly move in opposite directions as the left-hand screw-thread acts on one and the right-hand screw-thread on the other, and thus whatever may be the direction of rotation of said spindle the clutches are always moved in opposite direction. Said gripping device or clutch is shown in Figs. 10, 11, and 12. It consists of a frame J, mounted to slide on the main machine-frame A, and is provided with apertures through which the spindle H, the rod I, and the central longitudinal shaft K of the machine can pass. In the bottom of said clutch-frame J a sleeve K' is mounted to rotate, which sleeve is provided with a key K², that can slide in a longitudinal groove K³ in the shaft K. On one end of said sleeve a cog-wheel K⁴ is formed, that engages a cog K⁵ on a sleeve K⁶, mounted to turn in the upper part of the frame J, and through which sleeve K⁶ a sleeve L passes, which is provided at one end with a flanged collar L', that is embraced by the forked end of an arm L², the opposite end of which is secured on a friction-sleeve L³, mounted to slide on the rod I. The sleeve L, through which the paper tube passes, and the inner diameter of which sleeve is such that the tube fits quite snugly in the same, is provided with three longitudinal slots L⁴, in which jaws L⁵ are mounted in such a manner that they can move toward and from the center of the sleeve, said jaws consisting of strips or blades guided by pins L⁶. Each jaw L⁵ is provided in its outer edge with a notch L⁷, for receiving the free end of a cam L⁸, pivoted between lugs K⁷ on the sleeve K⁶. The tubular pivot B² on the bar B' carries a cog-wheel M, which engages the cog-wheel M' on the driving-shaft K, so that when the mechanism is in operation said shaft K is rotated, and by means of the cog-wheels K⁴ and K⁵ rotates the sleeve K⁶ at all times in the same direction that the tube that is being formed rotates, and also at the same speed. As the completed tube moves from left to right, it follows that the gripping device must grasp and hold the tube while moving from left to right, but must not act on or grip the tube while the gripping device is moving from right to left. For example, as shown in Fig. 11, the jaws L⁵ are not in position for gripping the tube. Assumed that the gripping device shown in Fig. 11 is moving from right to left and that at a certain time the direction of rotation of the screw-spindle H is reversed, whereby the direction of movement of the gripping device or clutch is also reversed, the sleeve L will not reverse as rapidly as the remaining part of the grip, for the reason that said sleeve is held by the arm L², which in turn is connected with the friction-sleeve L³, sliding on the rod I. It thus follows that when the direction of the gripping device is suddenly changed to the movement toward the right the sleeve L will remain stationary, on account of the friction between the sleeve L³ and the rod I, for a very short time, and during the time that said sleeve remains stationary and the remaining part of the grip or clutch moves in the direction toward the right the pivot ends of the cams L⁸ move a short distance toward the right in relation to the sleeve L, and in so doing force downward the jaws L⁵, which are pressed gently against the outer surface of the tube, but nevertheless with sufficient force to grip or grasp said tube, which is thus carried along with the clutch or gripping device in its movement toward the right. The friction of the sleeve L³ on the rod I is overcome and said sleeve moves with the rest of the gripping device in the direction toward the right. If, then, again after a certain time the direction of the movement of the clutching device is reversed, the sleeve L again remains stationary for a very short time, and the pivot ends of the cams L⁸ are moved in the direction toward the left in relation to the sleeve L, and it thus follows that the lower ends of the cams L⁸ swing upward, thereby releasing the jaws, which no longer bind on or grip the tube, thus permitting the gripping device to pass along the tube in the direction toward the left without in any way affecting said tube. As the machine has two gripping devices or clutches which always move in opposite directions, it follows that one of the clutches or gripping devices at all times engages the tube, which is thus constantly being moved in the direction toward the right. As has been said above, the sleeve containing the gripping device or clutch is being constantly rotated in the same direction as the tube and at the same speed, and thus there is no possibility of in any way injuring or defacing the exterior face of the tube or in any way interfering with the movement of the same. As there is no interruption whatever in the formation of the tube, it is very essential that the device for reversing the direction of rotation of the screw-spindle shall be so constructed that there shall be no lost motion whatever, and thus no interruption whatever in the longitudinal movements of the tube.

The clutching device will now be described. The screw-spindle H is provided with two collars N and O, which are fixed thereon, and between the same an eccentric P is fastened on said spindle, and said eccentric P is surrounded by another eccentric Q, which is loose thereon, and said eccentrics are so arranged that the thicker part of one eccentric is adjacent to the thinner part of the other, as shown in Fig. 9, and the circumference of the outer eccentric Q will be concentric with the spindle H. The outer eccentric Q is provided with an upwardly-projecting lug Q', which is arranged between the ends of the two sleeves R R, mounted loosely on the spindle H, as shown in Fig. 7, and each is provided with a fixed cog-wheel R'. The cog-wheel R' of the left-hand sleeve is engaged by cog-wheel R² of the tubular spindle C, and the cog-wheel R' on the left-hand sleeve is engaged by cog-wheel R³ on the shaft K, so that said wheels R R' on the two opposite sleeves R R are rotated in opposite direction. On each sleeve R a circumferentially-grooved collar S is mounted in such a manner that it cannot turn on the sleeve, but can slide on the sleeve in the direction of the length of the same, and in the groove of each collar S the prongs of a fork S' rest, which forks are secured on a longitudinal sliding rod S², arranged in suitable bearings at the side of the main frame A, and also passing through an aperture in a lug J² on one of the gripping or clutching devices, as shown in Fig. 1. On said rod S² two stops S³ are fixed, against which the lug J² of the said gripping devices or clutch can strike, thereby moving said rod in the direction of its length either to the right or left. As shown in Fig. 7, the spindle H is engaged with the right-hand sleeve R and is rotated with the same, the left-hand sleeve R being disengaged from the spindle. If now the lug $J^2$ strikes against the right-hand stop $S^3$ on the rod $S^2$ and moves said rod in the direction toward the right, both collars S are moved toward the right hand, the pin $S^5$ on the right-hand collar is moved out of the path of the lug $Q'$ on the eccentric Q, and the pin $S^5$ on the left-hand collar S is moved into the path of the lug $Q'$ and will eventually strike that lug, thereby turning the outer eccentric Q slightly on the inner eccentric P, and thereby causing said eccentric Q to bind on the left-hand sleeve R, at the same time disengaging the eccentric Q from the right-hand sleeve R, so that thereby the motion of the screw-spindle is reversed. If the lug $J^2$ on the gripping device strikes the left-hand stop $S^3$, the rod $S^2$ is moved in the direction toward the left, the pin $S^5$ on the left-hand collar S is moved out of the way of the lug $Q'$, and the pin $S^5$ on the right-hand collar S is moved in the path of the lug $Q'$, which it strikes, thereby turning the eccentric Q so that it binds on the right-hand sleeve R and is disengaged from the left-hand sleeve R, whereby the direction of rotation of the spindle H is again reversed, and so on.

On that side of the machine opposite the one at which the rod $S^2$ is arranged a sliding rod T is arranged, which is suitably guided in the frame of the machine and provided at one end with the head $T'$, adjacent to the wing $U'$ of a frame U, mounted to slide lengthwise on the rod I, and also to rock on said rod. A spring $U^2$, surrounding said rod, rests against a collar $U^3$ fixed thereon and against the sliding frame U, and serves to press the same in the direction toward the left. At the end of said sliding frame is a sliding sleeve V, through which the paper tube $m$ passes, said sleeve being provided with a notch $V'$. The sleeve V is also provided with a wing $V^2$, resting against the forward end of the frame U and provided with an aperture, through which the rod I passes. The spring $U^2$ presses said wing $V^2$ against the end of the frame U. A circular saw W is mounted on a suitable shaft journaled in the top of the frame U and provided with a pulley $W'$, over which a driving-belt passes. A ratchet-wheel $n$ is mounted on a pin $n'$, projecting from the frame A, and said pin $n'$ carries a rocking pawl-lever $o$, on the lower end of which a pawl $o'$ is pivoted, that can engage the teeth of the ratchet-wheel $n$, a suitable spring $o^2$ serving to keep the pawl engaged with the ratchet-teeth. The pawl $o^3$, pivoted on the machine-frame, serves as a check for the ratchet-wheel and prevents return movement. At regular intervals cams $p$ are attached to the wheel $n$ and project beyond the teeth, and they are adapted to act on an adjustable cam-piece $q$ on the arm or wing $U'$ of the swinging and sliding frame U. The outer end of the rocking pawl-lever $o$ is connected by a rod $r$ with a block $s$, secured on the sliding rod T, which block can be acted upon by the lug $t$ on the forward gripping or clutching device, as shown in Fig. 1. Three cam-pieces $p$ are shown on the ratchet-wheel $n$; but more or less may be used, according to the length at which the tubes are to be cut off.

Every time that the forward gripping device moves to the right its lug $t$ strikes the blocks $s$ on the rod T, thereby moving said rod to the right and causing the head $T'$ on the end of said rod to strike against the sliding and rocking frame U and to move the same to the right in the direction of its length, thereby compressing the spring $U^2$. At the same time the connecting-rod $r$ is moved to the right and the pawl $o'$ on the lower end of the rocking lever $o$ engages a tooth on the ratchet-wheel $n$. When the gripping device or clutch moves to the left, the expanding spring $U^2$ presses the frame U to the left, causing a like movement of rod T and the connecting-rod $r$, and this in turn causes the pawl $o'$ to rotate the ratchet-wheel $n$ the distance of one tooth. At every third tooth on the ratchet-wheel $n$ a cam-piece $p$ acts on the cam-piece $q$ on the frame U, thereby swinging the upper end of said frame U and the circular saw W in the direction indicated by the arrow $x'$, Fig. 14, causing the rotating saw to pass into the notch $V'$ in the tube V and to cut off the rotating tube $m$, passing through said sleeve or tube V. After the cut has been made and the cam-piece $p$ moves from under the saw, the frame U swings back and remains in this position for the next two forward movements of the front gripping device, and at the third forward movement the saw is again swung in the direction of the arrow $x'$ and cuts off the tube. The tubes can thus be cut off in any desired lengths by merely arranging the cam-pieces $p$ in a different manner on the ratchet-wheel $n$. The entire saw-frame U is moved in the direction of the length of the tube as soon as the lug $t$ of the gripping device strikes the block $s$, so that the saw W moves forward at the same speed with the tube that is to be cut; but the saw is only brought in position for sawing every third time that the saw-frame is moved lengthwise with the tube. The upper pulley, over which the belt for the pulley $W'$ passes, may be arranged to shift at the same time with and in the same direction as the pulley $W'$; but this is not necessary if the belt is made of sufficient length.

In order that the operation of the machine may be distinctly understood, it will be briefly recapitulated. The paper strip $a$ is unwound from the coil of paper in the reel B and is bent over lengthwise by the rollers $D^2$ and $D^3$ to form a U-shaped core on the mandrel C. It is then bent over by the tapering piece $B^4$ to form a tubular core, and then the strip $e$, provided with paste on both sides, is wound on the core spirally, and immediately thereafter the strip $g$, which is not provided with paste, is wound over the strip $e$ spirally, and the tube is thus formed. The tube is seized by the jaws of one grip and moved in the direction toward the right, the other grip at the same time moving toward the left without gripping the tube. Every time the forward gripping device completes a stroke in one direction or the other it moves rod S² longitudinally, whereby the direction of rotation of the screw-spindle H is reversed in the manner before stated, and then the grip or clutching device, which travels loosely on the tube in the direction toward the left, reverses, and, gripping the tube, moves toward the right, and the grip or clutching device, that has just moved the tube to the right, is disengaged from the same and travels loosely to the left. For every third movement of the forward gripping device in the direction toward the right the circular saw is swung against the tube formed and cuts off the same. The machine thus produces tubes constantly and continuously without any interruption or break. The tube is at all times moved forward positively, is not subjected to any undue strains, and there is no lost motion whatever that might cause any irregularity in the formation of the paper tube.

Having thus described my invention, what I claim as new, and desire to secure by Letters Patent, is—

1. In a machine for making tubes from strips, the combination, with a rotating reel mounted on a bar having a tubular pivot, of a mandrel secured to said bar and projecting through the tubular pivot, and a tapering end piece on the tubular pivot, through which tapering end piece the said mandrel passes, substantially as set forth.

2. In a machine for making tubes from strips, the combination, with a rotating reel formed on a bar provided with a tubular pivot, of a mandrel secured to the bar and projecting through the said tubular pivot, a block having a rounded edge at the inner end of the mandrel, and a roller having a concave circumferential groove adjacent to the curved edge, substantially as set forth.

3. In a machine for making tubes from strips, the combination, with a rotating mandrel, of a rotating tube surrounding it, a tapering end piece in said tube, through which tapering end-piece the mandrel passes, and a spring-strip, the free end of which rests against the mandrel a short distance beyond the said end piece, substantially as set forth.

4. In a machine for making tubes from strips, the combination, with a rotating reel, a tube connected with the reel to rotate with the same, and a rotating mandrel passed through the tube and connected with the tube, of a guide for guiding two strips upon a core on the mandrel, and springs for pressing one of said strips upon the core on the mandrel, substantially as set forth.

5. In a machine for making tubes from strips, the combination, with a rotating reel, tube, and mandrel, of a pivoted frame, a rod on said frame, a tube surrounding the rod and connected therewith by a spring, and guides for strips on the swinging end of said rod, substantially as set forth.

6. In a machine for making tubes from strips, the combination, with means for forming a core from a strip, of means for covering the core, and two reciprocating clutching devices adapted to grip or clutch the tube formed on said core, which tube clutches or gripping devices constantly travel in opposite directions, substantially as set forth.

7. In a machine for making tubes from strips, the combination of mechanism for forming a core from a strip of paper and mechanism for covering said core, with two reciprocating tube gripping or clutching devices mounted to constantly travel in opposite directions, and a screw having a right and left hand thread and engaging parts of said gripping devices or clutches, substantially as set forth.

8. In a machine for making tubes from strips, the combination of means for forming a core from a strip and mechanism for covering said core, with two reciprocating tube clutching or gripping devices mounted to move in opposite directions, a screw-spindle having right and left hand threads and engaging projections on said gripping devices, and means for automatically reversing the direction of rotation of the screw-spindle, substantially as set forth.

9. In a machine for making tubes from strips, the combination of means for forming a core from a strip and mechanism for covering said core, with reciprocating clutching devices for gripping the tube, and a swinging saw-frame operated from one of the gripping devices, substantially as set forth.

10. In a machine for making tubes from strips, the combination of means for forming a core from a strip and mechanism for covering said core, reciprocating gripping devices, a sliding and swinging saw-frame, and means for bringing said sliding and swinging saw-frame into operative position, which means are actuated by one of said gripping devices, substantially as set forth.

11. In a machine for making tubes from strips, the combination of means for forming a core from a strip and mechanism for covering said core, with reciprocating gripping devices or clutches, a sliding and swinging saw-frame, a ratchet-wheel operated from one of the gripping devices, and cams on said ratchet-wheel for inclining the saw-frame, substantially as set forth.

12. In a machine for making tubes from strips, the combination of means for forming a core from a strip and mechanism for covering said core, with reciprocating gripping devices or clutches, a sliding and swinging saw-frame, a reciprocating rod operated from one of the gripping devices, a pawl-lever connected with said rod, a ratchet-wheel operated from said pawl-lever, cams on said ratchet-wheel for inclining the saw-frame, a head on said reciprocating rod for pushing the saw-frame in the direction of its length, and a spring for pressing the saw-frame in the reverse direction, substantially as set forth.

In testimony that I claim the foregoing as my invention I have signed my name in presence of two subscribing witnesses.

HARMER DENNEY.

Witnesses:
 OSCAR F. GUNZ,
 W. REIMHERR.